J. H. BULLARD.
SPEEDOMETER.
APPLICATION FILED MAR. 3, 1906.

944,538.

Patented Dec. 28, 1909.
5 SHEETS—SHEET 1.

J. H. BULLARD.
SPEEDOMETER.
APPLICATION FILED MAR. 3, 1906.

944,538.

Patented Dec. 28, 1909.
5 SHEETS—SHEET 2.

Witnesses:
H. L. Sprague
E. H. Scalholm

Inventor:
James H. Bullard
by Chapin & Co.
Attorneys.

J. H. BULLARD.
SPEEDOMETER.
APPLICATION FILED MAR. 3, 1906.

944,538.

Patented Dec. 28, 1909.
5 SHEETS—SHEET 4.

Witnesses:
H. L. Sprague
E. F. Seaholm

Inventor.
James H. Bullard
Schapers Lee
Attorneys.

J. H. BULLARD.
SPEEDOMETER.
APPLICATION FILED MAR. 3, 1906.

944,538.

Patented Dec. 28, 1909.
6 SHEETS—SHEET 5.

Witnesses:
H. L. Sprague
E. H. Seabolm

Inventor:
James H. Bullard
by Chapin & Co.
Attorneys.

UNITED STATES PATENT OFFICE.

JAMES H. BULLARD, OF SPRINGFIELD, MASSACHUSETTS, ASSIGNOR TO BULLARD SPECIALTY CO., OF SPRINGFIELD, MASSACHUSETTS, A CORPORATION OF MASSACHUSETTS.

SPEEDOMETER.

944,538.   Specification of Letters Patent.   Patented Dec. 28, 1909.

Application filed March 3, 1906. Serial No. 304,137.

*To all whom it may concern:*

Be it known that I, JAMES H. BULLARD, a citizen of the United States of America, residing at Springfield, in the county of Hampden and State of Massachusetts, have invented new and useful Improvements in Speedometers, of which the following is a specification.

This invention relates to instruments for recording the distance traveled by a vehicle and the time occupied in covering said distance, in combination with a clock the mechanism of which actuates the record-dial, the recording devices being actuated by the movements of the vehicle.

A further object of the invention being to combine with the above construction an odometer arranged to be read in connection with the other instrument and actuated by the same mechanism which actuates the recording devices above referred to, the invention so far as it relates to the recording instrument and clock being in the nature of an improvement on the construction embodied in an application for Letters Patent of the United States filed by me on December 30, 1904 under Serial No. 239,001, which application was allowed September 12, 1905.

This invention consists in certain improvements in the recording instruments and means for actuating the same which greatly simplify and improve the construction shown and described in my aforesaid prior application, and it further consists in an arrangement of the odometer in proximity to the recording instrument whereby both may be read at a glance, but one mechanism being required to actuate the recording devices and the odometer, all of which will be fully described in the following specification and clearly pointed out in the claims appended thereto, the invention being fully illustrated in the accompanying drawings, in which,—

Figure 1:
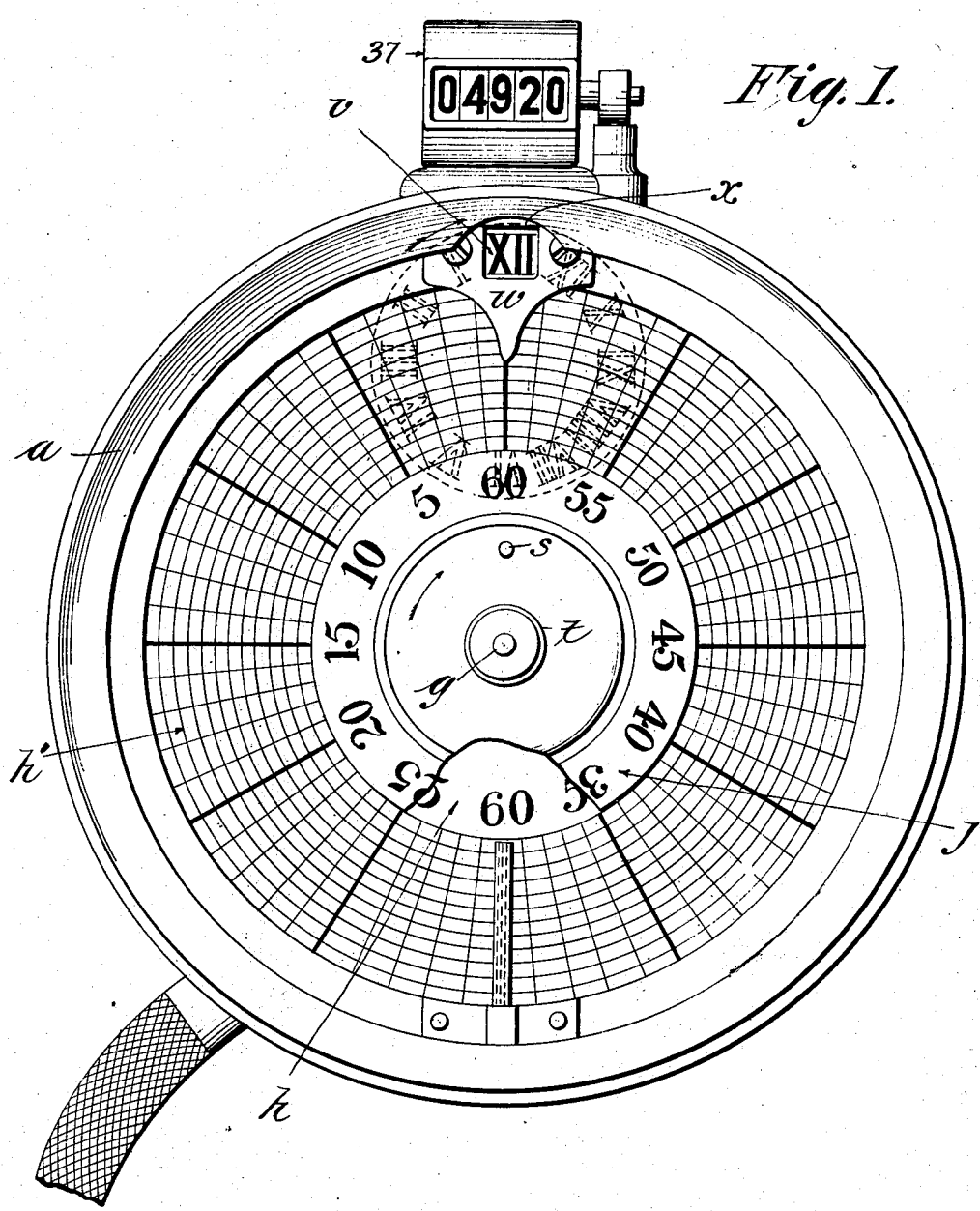
Figure 2:
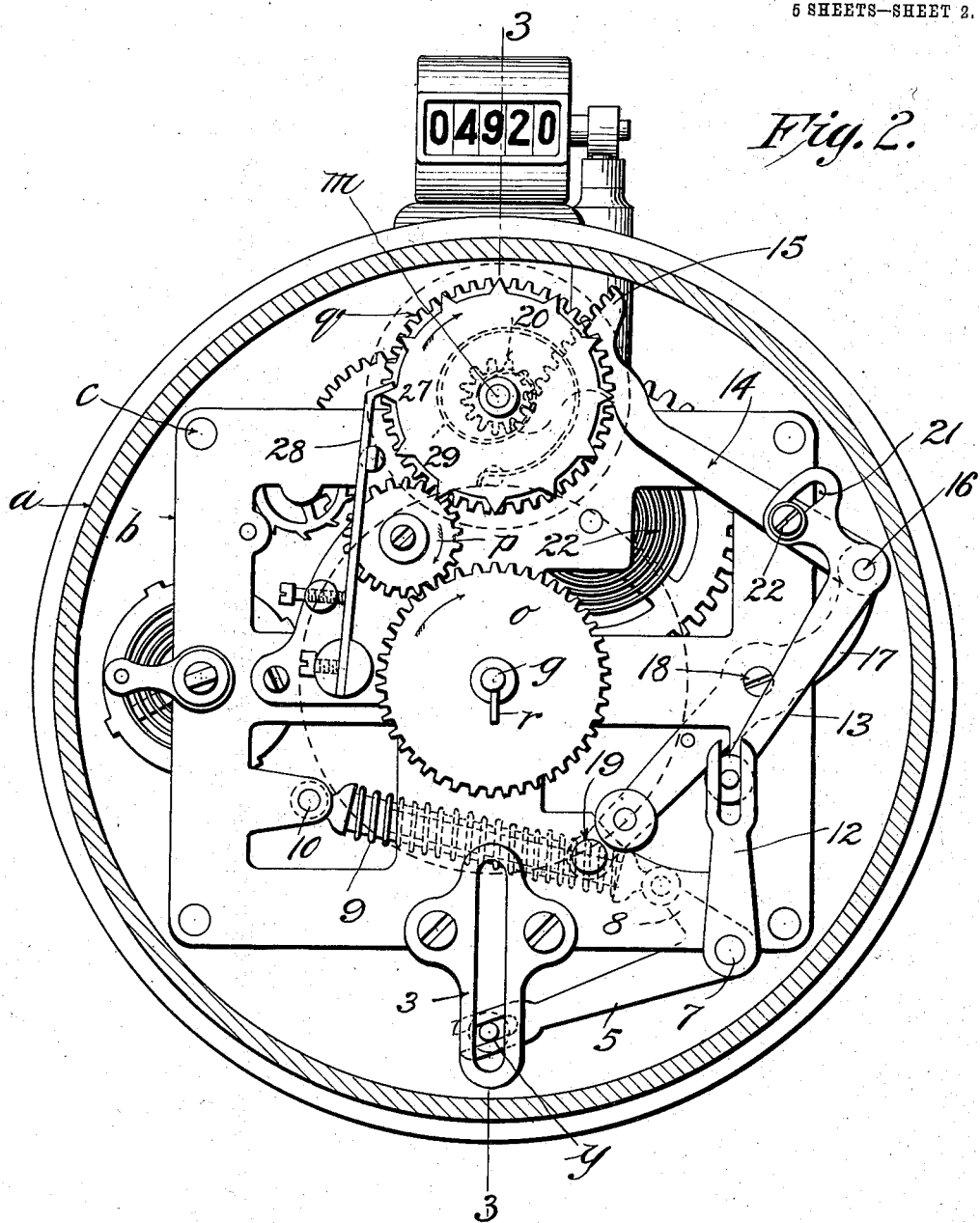
Figure 3:
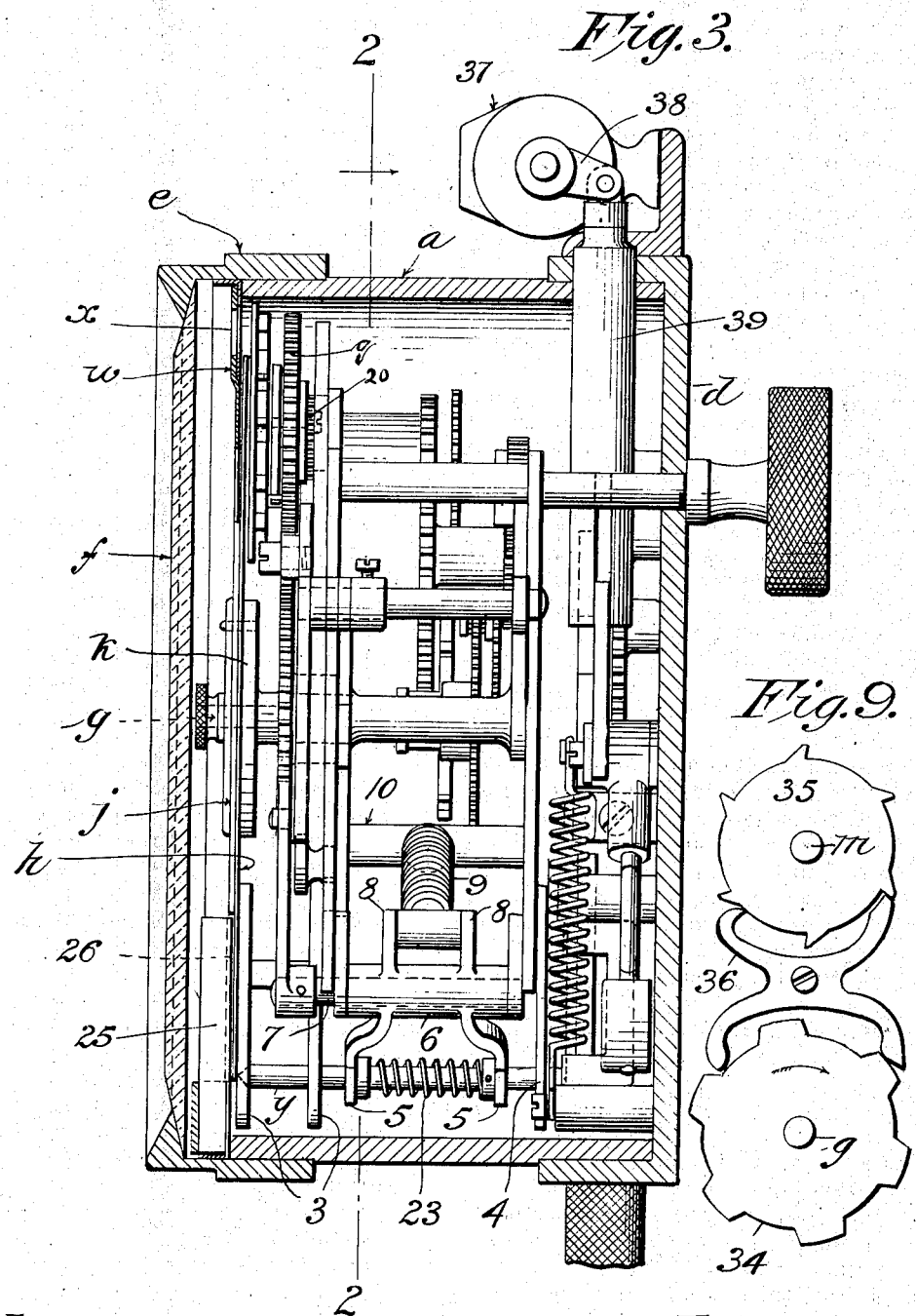
Figures 4, 5:
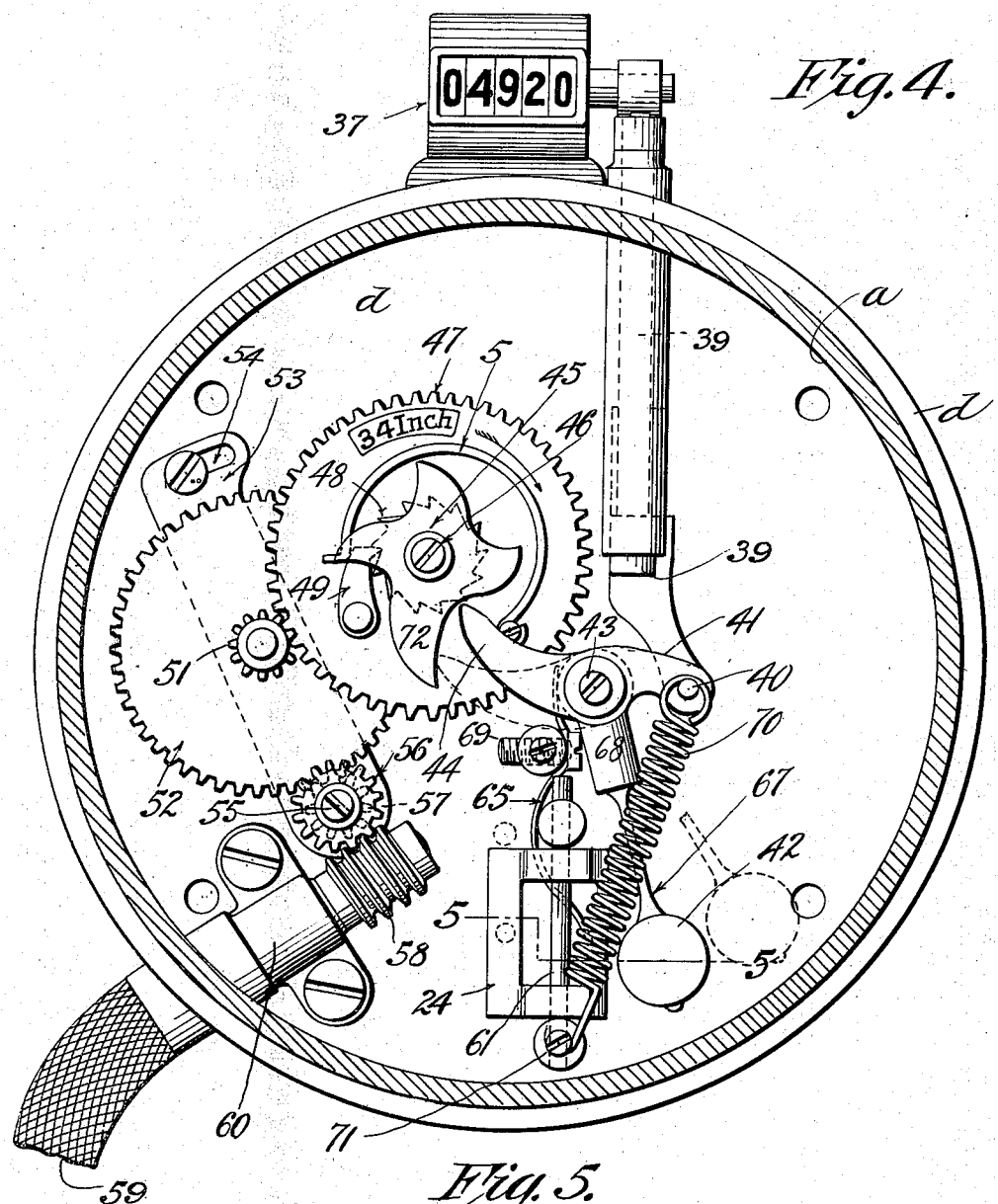
Figure 6:
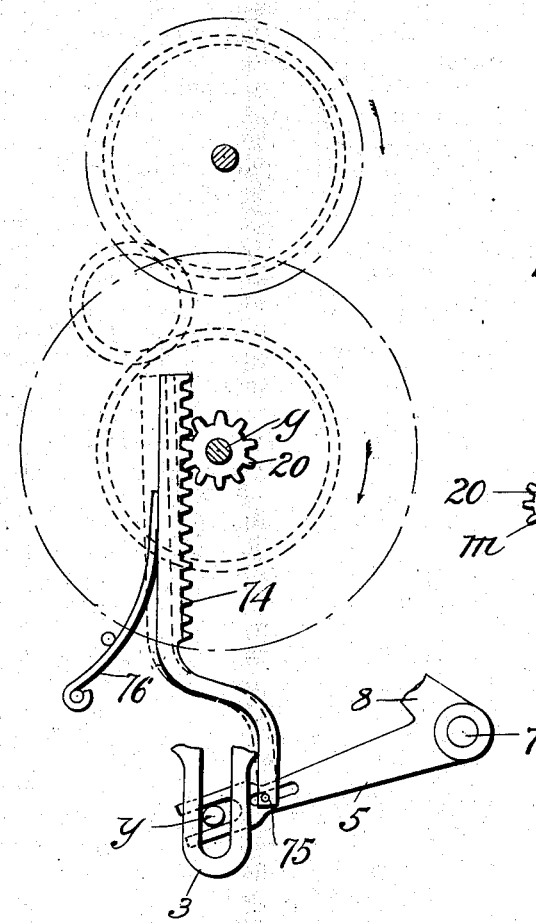
Figure 7:
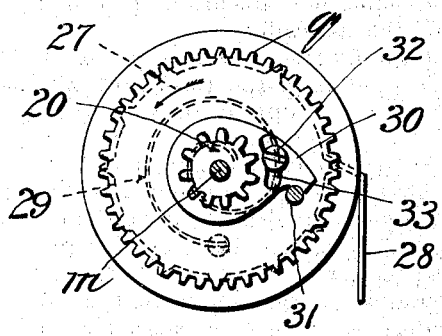
Figure 8:
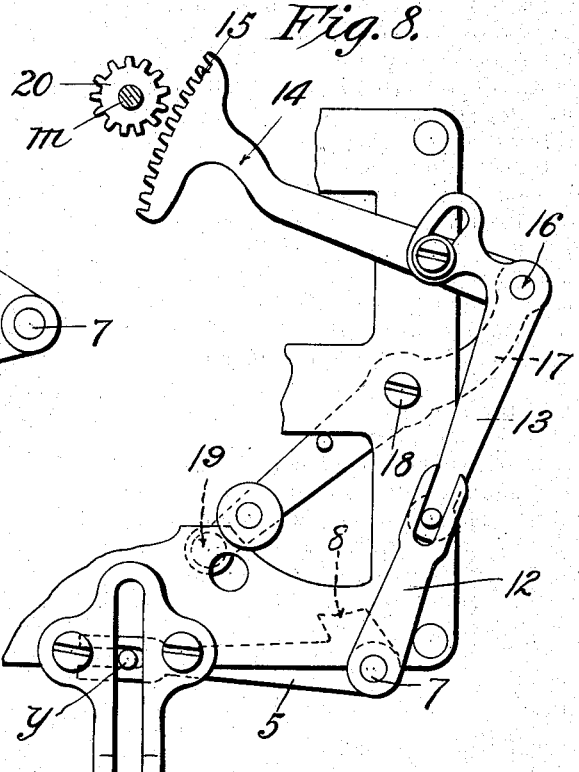
Figure 10:
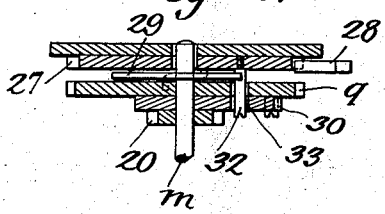

Figure 1 is a face view of the instrument in which the invention is embodied and showing the record dial, the clock, and the odometer. Fig. 2 is a similar view to Fig. 1 but with the record dial and time dial removed, this view showing particularly the improved means to move the recording stylus of the instrument radially of the record-dial, and to set the same as when a new record dial is put in place, and also showing improved means to actuate the hour-dial periodically to bring one of the numerals thereon into view through an aperture in the case at the proper time. Fig. 3 is a side elevation of the mechanism shown in Fig. 2, the casing of the instrument being shown in section, the record dial being removed. Fig. 4 is a face view of the casing with the clock mechanism and the time and record dials carried thereby being removed, and showing the mechanism for actuating the puncturing stylus of the recording mechanism, and the means employed for actuating the odometer by the same means. Fig. 5 is a sectional view on line 5—5 Fig. 4 of the hammer and striker-frame which impinges on the stylus and showing also a portion of the latter. Fig. 6 shows a modified construction whereby provision is made for imparting the required radial movement of the stylus relative to the record-dial, the point of view being the same as Fig. 2, but the gears being shown in dotted lines. Fig. 7 is a detail view of the devices whereby the necessary tension is stored in a spring to rotate the hour dial to periodically shift the latter to bring the new numeral thereon into view at the expiration of each hour, this being a rear view of the parts. Fig. 8 is a front view of the devices to move the stylus radially, showing means to disconnect them from their actuating pinion whereby when the stylus has reached the limit of its movement toward the center arbor and filled one record dial, the stylus may be reset to begin on another at the periphery thereof. Fig. 9 is a front view of a well known mechanical movement which may be substituted for the means shown and described herein as the preferred means, to permit the periodic rotation of the hour dial. Fig. 10 is a detail sectional view of Fig. 7 showing the operation of the slot and pin construction, the section being taken on a diametrical line passing through the pin.

In its general aspects, this instrument as far as the mechanism contained within the circular case *a* is concerned, is substantially like that illustrated in my said prior application, attention being directed particularly to certain improvements in certain parts of said mechanisms which will now be described, these improvements being shown in their assembled relation in Fig. 2 and more in detail in Figs. 5, 7, and 8, and that part of the invention embodying substantially new features as compared with my said prior application are more particularly illustrated in Fig. 4.

Like characters in the different figures refer to like parts, and referring now particularly to Fig. 2, b indicates the frame of a clock mechanism supported in the casing a in any suitable manner, as by screws, which are not shown in the drawing but which are threaded into holes in the ends of the posts c of the frame,—these posts resting against the rear wall d of the casing. The casing proper, while generically indicated by a, is made up of three parts comprising the central, cylindrical portion and a closure for each end thereof,—that at the rear being, as stated, indicated by d, and that at the front being indicated by e, the latter being provided with a glass front f. The elements d and e are practically caps for the cylindrical part a. The front closure or cap e is removably secured to the casing in any suitable way, as by a bayonet joint connection, which will give access to those parts of the mechanism which are contiguous to the front of the instrument; as, for example, the center arbor g of the clock mechanism and the paper record dial h, and the clamping washers j and k between which the record dial is secured on said center arbor to rotate therewith. Located above the center arbor in substantially the same vertical plane is the hour-dial arbor m. This term "arbor" is applied to establish a uniformity of terms for use in the claims. As a matter of fact, the hour-dial has no arbor but rotates on a fixed stud to which the leading-in line of the letter m is carried, the gear q being provided with a long hub which does not show clearly in any of the drawings, and to which is secured the pinion 20 which will be referred to later. The center-arbor g is, by a clock train of the usual construction, arranged to rotate at minute-hand speed, viz.,—once an hour. This arbor is provided with a gear which, by means of an intermediate gear p meshing with a gear q on the hour-dial arbor m, rotates the latter at the same speed as the center-arbor. The clamping washers j and k turn with the center-arbor g, the washer j fitting over the end of the spindle and being provided with a slot into which a key or feather r (shown in Fig. 2) enters, and on the front of this washer is a pin s, the record dial being provided with a centrally located hole to fit the center-arbor g and with another offset hole to fit the pin s,—the washer j fitting over both pin and arbor and being secured to the latter by a nut t shown in Fig. 1. In this manner, a dial may be placed on the arbor with a given point thereon always bearing a certain relation to a given point on the arbor.

The record dial, as shown in Fig. 1, has printed thereon in circular form numerals indicating five minute spaces, these being overlaid by the washer j on which the same numerals are printed in reverse order; that is to say, the drawing shows that the numeral 60 on the washer is directly under the indicating pointer w showing that the hour of twelve, which shows through the aperture x, has just begun. Now, as the recording marks are made at the opposite side of the dial h, it is clear that the minute-indicating numerals on the latter must be in opposed relation to those on the washer j, for it is by means of the numerals on the latter that the hours and the minutes at which a certain speed is recorded are indicated. As described in my aforesaid prior application, the hour dial v is so located that only one of the numerals indicating the hours as visible at a time, a part of said dial being covered by a plate w, the lower end of which is in the form of an indicating pointer extending toward the numerals on the record-dial, there being an aperture x through the plate w. All that part of the hour dial not covered by the plate is hidden by the overlapping record-dial h. This arrangement is essentially the same as in my said prior application, the hour dial and the record dial being readable together to show the time in hours and fractions thereof.

As in my said prior application, the device employed to record on the dial h the distance covered by the vehicle is in the form of a stylus y clearly shown in Fig. 3, which plays freely in vertically slotted supports 3 and 4 carried on the frame of the clock, said stylus extending through two forked arms 5 forming part of a hub 6 rotatably supported on a shaft 7, and from this hub two short arms 8 extend at an angle thereto, between which one end of a spiral spring 9 is supported pivotally, the opposite end being similarly supported on a rock-shaft 10, this construction being clearly shown in Figs. 2 and 3. On the shaft 7 is an upstanding arm 12 (see the same figures) having a forked upper end engaging with a pin on the lower end of the arm 13 which, with the arm 14 provided at its upper extremity with a segmental rack 15, constitutes practically a rigid elbow-lever pivotally supported on a pin 16 carried on the end of an arm 17 which, in turn, pivots on the frame at 18, the lower end of the arm 17 having a short pin 19 thereon which extends through a hole in the frame whereby the lever 17 may be locked when the segmental rack 15 is in mesh with the pinion 20. The object of thus supporting the arms 13 and 14 which constitute the elbow-lever referred to, is to provide means whereby, as shown in Fig. 8, the lever 17 may have its pin 19 disengaged from the frame which will permit the free end thereof to be swung to the left to throw out of mesh the segmental rack 15 with its pinion 20 on the hour-dial arbor m. It is necessary to do this when the stylus reaches the limit of its upward movement radially of the record dial at which time the arm 14 will have reached the limit of its downward swinging movement and out of engagement with the pinion 20, the extent of this movement of the lever 14 being sufficient to carry the stylus y beyond the range of its actuating mechanism; and, therefore, while the stylus-actuating mechanism will continue its movement imparted thereto by some rotating member of the vehicle, the operation of the stylus on the record dial will cease, and as the rack 15 moves out of engagement with the pinion, it will interfere in no wise with the continued movement of the clock mechanism whereby the hour dial and record dial will be rotated as before, these two thus continuing to fulfil their functions of indicating the time in hours and minutes.

When it is desired to replace the old record dial with a new one, it is effected in the same manner as described in my said prior application by the release of the clamping washers j and k, the lever 17 first being moved to the position shown in Fig. 8 to permit the arm 14 carrying the rack to be swung up past the pinion 20 to substantially the position shown in Fig. 2 and then by swinging the lever 17 back again and snapping its lower end in engagement with the frame, the rack will be thrown into mesh with the pinion.

The arm 13 extends beyond its pivotal point 16 as seen in Fig. 2 and overlies the arm 14, and this overlying extension is provided with a slot 21 concentric to the pin 16 through which slot a screw 22 extends into the arm 14 to provide means to adjust the position of one of the arms 13, 14, relative to the other to locate the path of the stylus accurately in the space between two of the volute or spirally disposed lines $h^1$ of the disk h.

The spiral spring 9 is located, as shown, under compression between a fixed pivotal point 10 and the arms 8 in which it also pivots, and it maintains a contsant pressure on these arms 8 to move the stylus y toward the center arbor g as fast as permitted to do so by the rotation of the hour dial arbor m with the pinion on which the rack 15 engages; thus, obviously, the expansive action of the spring 9 is more or less of an aid to the main-spring 22 of the clock mechanism shown in Fig. 2.

By the foregoing description of the means for actuating the stylus to move it radially of the record dial, it will be noted that as the radial movement of the stylus is constant, the path described by its point on the dial h during the rotation of the record dial will be a volute or spiral.

Referring to Fig. 3, it will be seen that the stylus has a spiral spring 23 applied thereto in such manner that when it is struck by the striker-frame 24 (Fig. 4) it will be advanced to puncture the record dial against the action of this spring to the end that the latter may retract the stylus immediately. This spring is located between one of the arms 5 and a collar secured to the stylus. Opposite the point of the stylus and disposed in the path of the radial movement of the latter is an abutment 25 having V-shaped groove 26 therein, and as the record-dial h rotates between the stylus and the abutment 25, the point of the former will pierce the dial from the backside thus raising a slight conical projection on the face thereof which is readily visible.

Improved means have been provided to effect the periodic rotation of the hour dial, this construction being shown in Fig. 7, and from the opposite side thereof in Fig. 2. In this last named figure the hour dial plate has been removed from its arbor m.

On the hub of the gear q is mounted loosely a toothed wheel 27, the teeth of which are preferably conical and are twelve in number, and with these teeth the hooked end of a spring-finger 28 has a sort of hook engagement of such a nature as will permit the toothed wheel to snap by the end thereof, the finger 28 springing back again into the path of movement of the next tooth in time to arrest a further rotative movement of the wheel. This toothed wheel 27 is connected to the arbor m by means of a spiral spring 29,—one end of which is secured to the arbor and the other to the wheel. Now, by referring to Fig. 7, it will be seen that under the gear q is a member 30 loose on the gear-hub, and a pin 31 on the gear against which the end of the member 30 is normally held, and a screw 32 extends through a concentric slot 33 in the member 30 and screws into the toothed wheel 27. Now as the gear q rotates, the spring-finger 28 will hold onto the toothed wheel and the numeral of the hour dial, which is secured to this wheel, will remain visible through the opening x of the plate w for the period of one hour during which time the continued rotation of the gear q will have wound up the spring 29 to such a degree that the tooth on the wheel 27 will slip out from under the finger 28 allowing the toothed wheel and the hour dial secured thereon to make a partial revolution equal to the distance between two teeth, which is the same as the space between one hour space and the next on the dial, the toothed wheel 27 being limited in its forward throw by the length of the slot 33 in the member 30,—the screw 32 acting as a stop. In other words the finger 28 holds the toothed wheel 27 stationary until about the moment the screw 32 brings up against the end of the slot 33 in the member 30, and ordinarily the tension of the spring 29 will effect the escapement of the tooth from the spring-arm 28, but if for any reason this escapement should not be effected in that manner, the contact between the end of the slot and the screw will force the tooth past the restraining end of said arm 28 whereupon said toothed wheel will fly forward the length of the slot 33, that is the distance equal to one-twelfth of a revolution. Another mechanism whereby this same movement of the hour dial may be produced is shown in Fig. 9, and it consists in providing an escapement movement between two toothed wheels 34 and 35 one fixed on the center-arbor $g$ and the other loosely mounted on the arbor $m$ and actuated by a spring or weight which will effect the partial rotation thereof at the proper time by the oscillatory movement of the double pawl 36 which lets go of one of the teeth of the wheel 35 and engages with the one spaced one-twelfth of a revolution next behind it. This is a well known escapement movement and could be substituted for the preferred construction above described and could be applied by any one skilled in this art, and it therefore needs no further particular description.

Referring now to Fig. 4, the mechanism shown herein is entirely separate from the clock mechanism it being all secured to the cap which constitutes the rear wall $d$ of the casing, and on the outer rim of the cap is secured the odometer 37. This is of the usual type and is operated by the movement of the crank-arm 38 shown in Fig. 3 with which the vertically disposed connecting-arm 39 is connected. This extends through the rim of the cap and its lower end is connected at 40 with the arm 41 of a hammer, the head of the hammer being indicated by 42. This hammer is pivotally hung on a pin 43 and has another arm 44 which extends into the path of a cam 45 which is loosely mounted on a pin 46 on which is also supported the gear 47. The cam 45 is constructed to rotate with the gear by means of a ratchet 48 on the cam and a pawl 49 on the gear, the pawl being held in engagement with the ratchet by the spring 50, the object of this construction being referred to farther on. The gear 47 meshes with a pinion 51 which rotates with a larger gear 52, the latter being mounted on a swinging arm 53 pivotally supported on the cap $d$ and provided with a slot 54 at its upper end through which a screw passes into the cap whereby the pinion 51 may be swung toward and from the gear 47. This gear, as shown by the mark thereon, is of a suitable diameter to adapt the instrument for use on a vehicle provided with a thirty-four inch wheel. If it is desired to apply the instrument to a vehicle having a thirty or thirty-six inch wheel, then the gear 47 would be removed and a larger or smaller gear substituted for it which would necessitate of course the adjustment of the swinging arm 53 to bring the pinion 51 in mesh with such larger or smaller gear. The arm 53 swings on the pin 55 which constitutes also the axis of the two pinions 56 and 57 the latter of which meshes with the gear 52 and the former with a worm 58 on a flexible shaft 59 which extends to the hub of one of the wheels of the vehicle, the outer end of the shaft being provided as usual in this class of instruments, with a pinion in mesh with a gear on the wheel, these not being shown in the drawings. The worm 58 is supported in a suitable bearing 60 on the cap $d$.

As shown in Figs. 4 and 5 there is located in the lower part of the cap the striker-frame 24 which is supported on a short shaft 61 in parallelism with the back of the cap $d$, as shown in Fig. 5. In plan, this striker-frame is rectangular as shown, and one of the sides 63 thereof adjacent the back of the cap $d$ is in position to be struck by the hammer 42, and the other side 64 of this frame, opposite the side 63 is located in a higher plane in such position that when the frame is oscillated by the impact of the hammer against the side 63, this side 64 will swing in the plane of the stylus $y$, and drive the latter against the abutment 25 to perforate the record disk or dial which rotates between them. A spring 65 suitably supported on the cap extends in under the frame and up back of the side 63 thereof to normally press that side toward the hammer, thus holding the other side 64 against a stop-screw 66.

The hammer 42 is provided with a spring-arm 67 which is secured in a boss 68 of the hammer-frame, and an adjusting screw 69 is mounted in a boss on the cap in such position that the end thereof will serve as an abutment against which the boss 68 of the hammer frame will strike when the hammer is actuated by the cam 45,—this boss striking on the screw snaps the hammer forward toward the striker-frame and against the side 63 thereof, and by the adjustment of the screw 69, the force of this blow may be regulated. One end of the spring 65 bears, as stated, on the striker-frame 24, the opposite end being extended to and in contact with the hub of the hammer-frame, whereby the latter may oscillate under more or less frictional resistance.

A spiral spring 70 is provided which extends from the pin 40 to another pin 71 on the cap, this spring serving to actuate the hammer-frame when the latter is swung on the axis by the cam 45 and also serves to retract the arm 39 when this has been actuated to operate the odometer 37. The cam 45 is a four-armed cam and it rotates on its stud in the plane of the arm 44 of the hammer-frame, three of the arms of this cam being of the same length, while the fourth is somewhat longer. Therefore, during the rotation of the cam, the arm 44 of the hammer-frame will have imparted thereto three uniform movements in succession, the fourth being longer. The three uniform movements are not of sufficient extent to raise the arm 41, and the arm 39 far enough to cause the crank-arm 38 of the odometer to actuate the latter, but this movement is sufficient of course to actuate the hammer 42 to cause the stylus to make an indentation in the recording dial. When the fourth arm 72 of the cam depresses the arm 44 of the hammer-frame, it moves the arm 41 of the latter to a sufficient degree to actuate the odometer and at the same time swings the hammer 42 outwardlly farther from the striker-frame 24. Therefore, when the arm 44 runs off the cam-arm 72, the retraction of the spring 70 will swing the hammer against the striker-frame with greater force than usual and make a deeper indentation in the record dial than will result when the hammer is actuated by the three shorter arms of the cam. Thus, while the movement of the train of gears between the flexible shaft and the cam is always uniform, on every fourth movement of the hammer a deeper indentation will be made in the record dial to mark the mile, and at the same time the odometer will be actuated to record the mile, and the mechanism is so proportioned in the instrument illustrated in the drawing as to make one indentation in the record dial for each quarter mile run by the vehicle, and the odometer is therefore actuated on every fourth quarter to indicate the mile. Of course, the quarter mile is an arbitrary unit, and if desired a cam may be used in this instrument constructed to use either the one-eighth or the half-mile as a unit which may be effected by varying the number of arms on the cam.

Referring now to the ratchet connection of the cam 45 with the gear 47, this is for the purpose of preventing any damage to the instrument should the vehicle to which it is attached be run backward, and when this occurs the arm 44 will hold the cam 45 stationary and allow the gear 47 and the other connecting gears to rotate in the reverse direction, the ratchet snapping by the pawl 49.

It is to be noted in connection with this instrument that it is so constructed that all of the parts thereof are slow-moving, the worm 58 on the end of the flexible shaft 59 being the most rapidly moving part of the mechanism, and as well known, a worm may rotate very rapidly without appreciable wear.

Referring now to Fig. 6, there is shown a modification of the construction in Fig. 8 to move the stylus radially of the record-dial, and it consists in locating a pinion (like the pinion 20) on the center-arbor $g$ and arranging a rack 74 to engage this pinion, the lower end of the rack being connected, as at 75, to the arms 5 by which the stylus is moved, a spring 76 being located back of the rack to hold it in mesh with its pinion and at the same time permit it to be swung out of engagement therewith and pushed downward to locate the stylus at the periphery of the record-dial, at which place the record is usually begun.

In my said prior application the hour dial is rotated in reverse direction to the record dial by a spur on the latter engaging notches on the former; whereas, in the present construction the hour dial and record dial rotate in the same direction, through the gear connections described, but the hour dial is mounted on the gear $g$ in such manner as to permit it to be held stationary while the gear is making one-twelfth of a revolution and is then released and snaps forward in the direction of rotation of the gear with which it is connected by a spring in which tension is accumulated during the time the hour dial is held stationary.

Having thus described my invention, what I claim and desire to secure by Letters Patent of the United States, is:—

1. An instrument of the class described comprising a support for a record-dial rotatable at minute-hand speed, an hour-dial, and a suitable clock movement to actuate the dials, the latter being readable together to indicate the time, means to mark the record dial to indicate successive occurrences, an odometer in proximity to said instrument, and a common actuating mechanism for the odometer and the record-dial marking means.

2. In an instrument of the class described, the combination with a suitable power mechanism, of a support for a record dial rotating continuously at minute-hand speed said disk receiving during its rotation the record of successive occurrences, and a time dial having partial rotary movement at periods, said time dial being arranged in complemental relation to the record disk on the same side or face of the instrument, and means to mark the record disk; together with an odometer located in proximity to the instrument, and one mechanism to actuate both the record-marking means and the odometer.

3. The combination in an instrument of the class described of a clock movement and the center arbor thereof, of a support for a record dial on said arbor rotatable at minute-hand speed, an hour-dial, a separate arbor therefor, means to rotate said hour-dial by the movement of the center-arbor, a device to mark successive occurrences on the record-dial, mechanism actuated by the clock movement to move said marking device radially of the record dial, and means to shift said actuating mechanism out of operative relation to the clock movement to arrest the radial movement of said marking device.

4. An instrument of the class described comprising a support for a record-dial rotatable at minute-hand speed, an hour-dial, and a suitable clock movement to actuate the dials, means to mark the record-dial to indicate successive occurrences, an odometer in proximity to said instrument, a common actuating mechanism for the odometer and the record-dial marking means, said clock movement and said actuating mechanism consisting of separate entities located in operative relation one to the other in the same casing.

5. An instrument of the class described comprising a support for a record dial rotatable at minute-hand speed, an hour dial, and a suitable clock movement to actuate the dials, means supported on the clock movement to mark the record dial, said dial-marking means being movable radially of the record-dial by the movements of the clock, together with means to adjust the marking means toward and from the axis of the record dial.

6. An instrument of the class described comprising a clock movement and the usual center-arbor thereof, a support for a record dial on the center-arbor rotatable at minute-hand speed, an hour-dial and a separate arbor therefor having a driving connection with the center-arbor, both of said arbors being continuously rotatable, said hour-dial having a limited rotatable movement on its arbor, means to hold said dial stationary during a partial revolution of its arbor, and a spring connected with the arbor and the dial whereby upon the release of the latter it will be rotated on its arbor a distance equal to the degree of rotation of the arbor while the dial was stationary.

7. An instrument of the class described comprising a support for a record dial rotatable at minute-hand speed, an hour-dial and a suitable clock movement to actuate the dials, a stylus supported in operative relation to the record dial to mark the latter; an odometer, a striker-frame to actuate the stylus, a hammer for the striker-frame, and a device to impart periodic movements to the hammer and to the odometer; said odometer and the actuating mechanism common to it and to the stylus constituting mechanism separate from the clock movement, and a two-part casing for said separate mechanisms.

8. In an instrument of the class described, the two-part casing, a clock movement in one of said parts, a support for a record-dial mounted on the center-arbor of said movement, means associated with said clock movement to mark said dial; an odometer, and mechanism located in another part of the casing and operable from a point outside of the instrument to actuate the odometer and to actuate the dial-marking means, said mechanism being arranged to impart a plurality of impulses to the dial-marking means to one actuating impulse imparted to the odometer.

JAMES H. BULLARD.

Witnesses:
 WM. H. CHAPIN,
 H. W. BOWEN.